United States Patent
Varanda

(10) Patent No.: US 7,483,694 B2
(45) Date of Patent: Jan. 27, 2009

(54) METHOD AND SYSTEM FOR REMOTELY TESTING A WIRELESS DEVICE

(75) Inventor: Marcelo Varanda, Ottawa (CA)

(73) Assignee: Research In Motion Limited, Waterloo, ON (CA)

( * ) Notice: Subject to any disclaimer, the term of this patent is extended or adjusted under 35 U.S.C. 154(b) by 132 days.

(21) Appl. No.: 11/061,526

(22) Filed: Feb. 22, 2005

(65) Prior Publication Data

US 2005/0192002 A1 Sep. 1, 2005

Related U.S. Application Data

(63) Continuation-in-part of application No. 10/785,888, filed on Feb. 24, 2004.

(51) Int. Cl.
*H04Q 7/20* (2006.01)
(52) U.S. Cl. .................. 455/423; 379/29.01; 379/1.01; 379/1.04; 709/224; 709/250; 709/218
(58) Field of Classification Search ............. 455/67.11, 455/423, 67.4; 714/46; 340/635; 345/73; 725/37; 709/250, 224; 379/29, 29.01, 1.01, 379/22, 27.01; 710/62
See application file for complete search history.

(56) References Cited

U.S. PATENT DOCUMENTS

| | | | |
|---|---|---|---|
| 6,005,533 A | 12/1999 | Wilson et al. | |
| 6,233,543 B1 | 5/2001 | Butts et al. | |
| 6,304,895 B1 | 10/2001 | Schneider et al. | |
| 6,633,759 B1 * | 10/2003 | Kobayashi | 455/419 |
| 6,885,730 B1 * | 4/2005 | Bremer | 379/29.01 |
| 2002/0072359 A1 | 6/2002 | Moles et al. | |
| 2002/0087760 A1 * | 7/2002 | Clapp et al. | 710/62 |
| 2002/0112047 A1 | 8/2002 | Kushwaha et al. | |
| 2003/0051059 A1 * | 3/2003 | Zondervan et al. | 709/250 |
| 2003/0056012 A1 | 3/2003 | Said et al. | |
| 2003/0147512 A1 * | 8/2003 | Abburi | 379/88.22 |
| 2004/0044490 A1 | 3/2004 | Weber | |
| 2004/0073654 A1 * | 4/2004 | Sarma | 709/224 |
| 2004/0078721 A1 * | 4/2004 | Williams | 714/46 |
| 2004/0183756 A1 * | 9/2004 | Freitas et al. | 345/73 |
| 2005/0186913 A1 * | 8/2005 | Varanda | 455/67.11 |

FOREIGN PATENT DOCUMENTS

| | | |
|---|---|---|
| EP | 0 590 817 | 6/1994 |
| EP | 0837615 | 4/1998 |
| WO | WO01/95651 | 12/2001 |

* cited by examiner

*Primary Examiner*—Charles N Appiah
*Assistant Examiner*—Michael T Vu
(74) *Attorney, Agent, or Firm*—Moffat & Co.

(57) ABSTRACT

A method and system for testing a wireless device, the system comprising: a remote user interface for interacting with the data device from a remote location; and a wireless network for communication with the wireless data device from a remote location, wherein a tester can send information to and receive information from the wireless device over said wireless network and can monitor said wireless device and send inputs to the wireless device over the remote user interface thereby forming a closed loop communications path.

9 Claims, 4 Drawing Sheets

METHOD AND SYSTEM FOR REMOTELY TESTING A WIRELESS DEVICE

CROSS-REFERENCE TO RELATED APPLICATIONS

This application is a continuation-in-part of U.S. application Ser. No. 10/785,888, filed Feb. 24, 2004.

FIELD OF THE APPLICATION

This method and apparatus herein relates to a method and system for remotely testing a wireless device and in particular to a remote data and/or audio user interface for the wireless device and a communications path through a wireless network to the wireless device.

BACKGROUND

When developing a wireless device, one of the debugging steps includes testing the wireless device in an actual network. This involves bringing the device to the location of the wireless network and performing a series of tests on the device.

Wireless networks vary depending on the service provider and the region the network is situated in. In order to test a wireless device, it is therefore necessary to bring the wireless device to these various locations, which can be an onerous task. A better solution would be to locate the wireless device at the remote location and to have the ability to perform the tests from a central location.

Further, once a device has been released to the public, technical support to the customers is occasionally required. This generally involves bringing the wireless device to the technical support or performing technical support over the telephone with the end user providing input into the wireless device and then reporting the results back to technical support. In this case, it would again be more desirable for technical support to be able to directly control the wireless data device and to receive feedback from the device.

Other reasons for remotely controlling a wireless device and seeing the display of the device include training purposes where the device can be connected to an overhead projector and thereby project the display of the wireless device.

SUMMARY

The apparatus and method herein provide a remote user interface for a wireless device. An interface such as a USB, iRDA or Bluetooth is established between the wireless device and a remote personal computer, referred to herein as a server machine. The wireless data device includes software to capture the LCD display and this information is forwarded to the server machine computer. In a preferred embodiment, the wireless device is a data device, but other devices are contemplated.

The server machine has a network connection, which allows the server machine to be connected with a local personal computer referred to herein as a client machine. The server machine converts the data received over the interface from the wireless data device and sends it over the network to the client machine. At the client machine, software converts this data and displays it on the monitor of the client machine.

Keyboard or stylus input from the client machine is converted by software on the client machine and sent over the network to the server machine and over the interface to the wireless data device. An interface driver handling the interface for the wireless data device recognizes that it has received a data packet and simulates a driver for the wireless device, thereby causing the device to register the keystroke or stylus input performed at the client machine.

Alternatively, the client machine can include a graphic of the wireless data device on the monitor and data can be input using a mouse click over a key on the graphic of the remote data device.

In this way, a local user can control the remote wireless data device and obtain the results displayed on the wireless data device. Further, in this data mode the user can form a closed loop communications path for the device where the device can be communicated with both over the wireless network and through the remote user interface. Thus a tester could, for example, send an email to the device over the wireless network and see the results through the remote user interface.

The application therefore provides a system for remotely testing a wireless data device, the system comprising: coded logic configured to be executed on the tested wireless data device, the coded logic including; instructions for capturing visual output of the tested wireless data device, the tested wireless data device being configured to provide the captured visual output; and instructions for simulating at least one input driver at the tested wireless data device, the simulated input driver being configured to act based on at least one received input request to cause the tested wireless data device to register an input in accordance with said input request, a remote user interface for interacting with the tested wireless data device from a remote location, the remote user interface including a client machine, the client machine including: coded logic configured to obtain the captured visual output provided by the tested wireless data device, the client machine being configured to display a graphical representation simulating a display of said tested wireless data device in accordance with said captured visual output: and coded logic configured to submit the at least one input request to the tested wireless data device; wherein a tester can monitor said wireless data device output and control said wireless data device via input sent over said remote user interface thereby forming a second closed loop communications path; and a wireless network for communication with the tested wireless data device from the remote location, wherein the tester can send information to and receive information from said wireless data device over said wireless network and can monitor said wireless data device and send inputs to said wireless data device over said remote user interface thereby forming a first closed loop communications path.

The application further provides a method of remotely testing a wireless device from a remote location comprising the steps of: interacting with the wireless device through a remote user interface from the remote location, said remote user interface including a client machine, the interaction including: graphically simulating a display of said wireless device on the client machine: and simulating input at the wireless device in accordance with input requests obtained from the client machine; and sending information to the wireless device and receiving information from the wireless device over a wireless network, whereby said interacting step and sending and receiving step forms a first closed loop communications path with the remote wireless device for testing the wireless device.

BRIEF DESCRIPTION OF THE DRAWINGS

The above is best understood with reference to the drawings, in which.

DETAILED DESCRIPTION OF THE DRAWINGS

Figure 1:
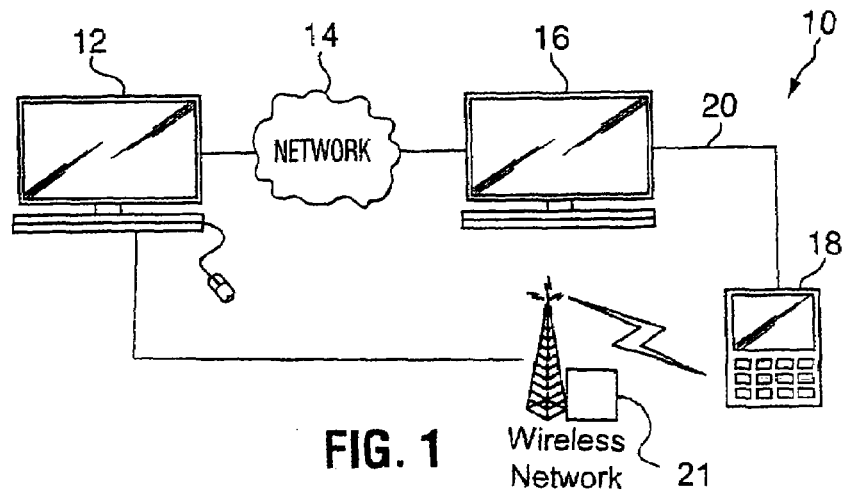
FIG. 1 is a schematic diagram of the system herein.

Reference is now made to the drawings.

The remote user interface 10 for a wireless device includes a client machine 12 that generally is located remotely from the wireless device. In a preferred embodiment, client machine 12 is a personal computer. Software running on client machine 12 displays an image simulating the wireless device. The display can be either only the LCD display as seen on the wireless device, or can include an image of the entire wireless device, including the LCD display and any keypad on the device.

Software running on client machine 12 further has the capability of interacting with a communications channel such as network 14 in order to provide communication between the client machine 12 and a server machine 16. Networks 14 are well known in the art and can include the internet, a wide area network, a local area network, or simply a connection between two computers. One skilled in the art will appreciate that other communication means between two computers are also known in the art. Further, in some situations where the server machine and the client machine are the same computer, network 14 may be a simulated internal communications channel.

Server machine 16 includes software for communicating with network 14, thereby allowing communications to and from client machine 12. Server machine 16 further includes software for communicating with a wireless data device 18 whose user interface is being simulated on client machine 12.

Wireless data device 18 and server machine 16 are connected through an interface 20. Interfaces between data devices and personal computers are well known, and can include, among others, a universal serial bus (USB) connection, an infrared connection, a Bluetooth connection, or other wired or wireless communication means.

A wireless network 21 communicates over an air interface with wireless device 18 through a base station and further the network includes access to client machine 12 through the data network. In one example, wireless network could support delivery of an email to wireless device 18 using an Internet connection on client machine 12.

Figure 2:
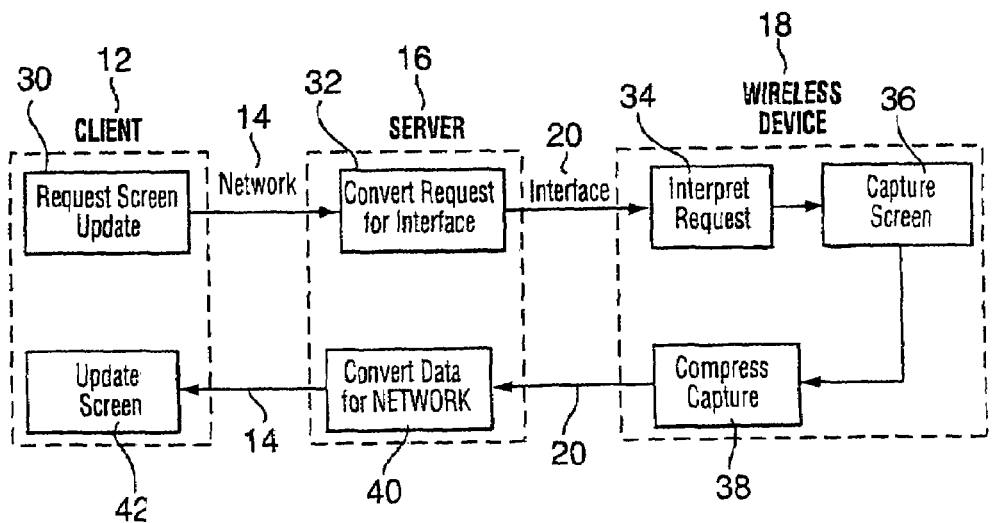
FIG. 2 is a process flow chart for the steps required to update a client's screen.

Reference is now made to FIG. 2. The embodiment herein seeks to maintain the current display of wireless data device 18 on client machine 12. To do this, software on client machine 12 requests an update of the screen of the wireless data device 18 periodically. In a preferred embodiment, this screen update request 30 is performed every 500 milliseconds. However, depending on the requirements, the screen update request may be more or less frequent.

Screen update request 30 is sent by client machine 12 over network 14. Server machine 16 receives the screen update request 30 and in step 32 converts the request to an appropriate format for sending over interface 20.

Wireless device 18 receives the converted request over interface 20 and in step 34 interprets the request. Step 34 determines that an LCD display capture is being requested and wireless device 18 moves to step 36. In step 36, the LCD display is captured and wireless device 18 next moves to step 38.

In step 38, the captured LCD screen is compressed for transmission. One skilled in the art will realize that this compression step is optional and that data may be transmitted without being compressed.

Wireless device 18 next transmits the captured LCD screen over interface 20 back to server machine 16. Server machine 16 in step 40 converts the captured screen into a format acceptable for network transmission. Server machine 16 further sends the converted data from step 40 over network 14.

Client machine 12 receives the converted screen capture and in step 42 updates the display on its screen. In this way, the client machine 12 maintains a graphical display identical to the graphical display of the wireless data device 18.

Figure 3:
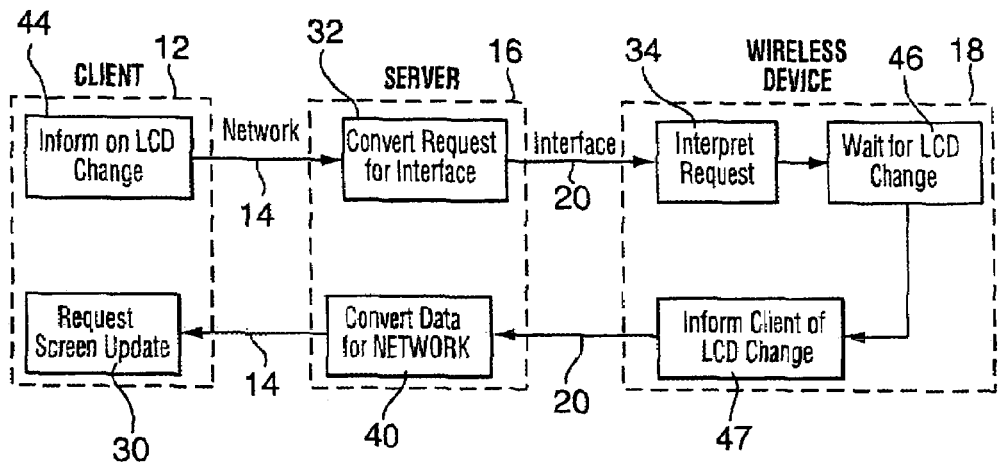
FIG. 3 is a process flow chart for the steps required to simulate a stylus event on the wireless device.

Reference is now made to FIG. 3. In one embodiment the constant requests for screen updates generate a significant amount of network traffic, which may be unacceptable to the network. In this case, a client 12 may request that the LCD display inform the client when the LCD display changes.

Changes in the LCD display may be a result of a user input, an automatic function such as a clock, received messages over the wireless network, or for other reasons known to those skilled in the art.

In FIG. 3, client machine 12 therefore requests in step 44 that wireless device 18 inform it when a change has occurred on the LCD display of wireless device 18. This request is sent over network 14 to server machine 16, where it is converted for interface 20 in step 32. This request is then sent over interface 20 to wireless device 18 where the request is interpreted at step 34. The wireless device then waits in step 46 for the LCD screen to change.

Once the LCD screen changes, wireless device 18 generates a message in step 47, which is sent over interface 20 to step 40, which converts the message for the network. The message is then sent over network 14 to step 30, in which the client machine requests a screen update. The request then follows the method described above in relation to FIG. 2.

In an alternative embodiment, in step 47 the wireless device could include a screen capture, and this could be sent over the network with or without screen compression step 38. Client 12 in the alternative embodiment would perform an update screen step 42 rather than request a screen update.

Figure 4:
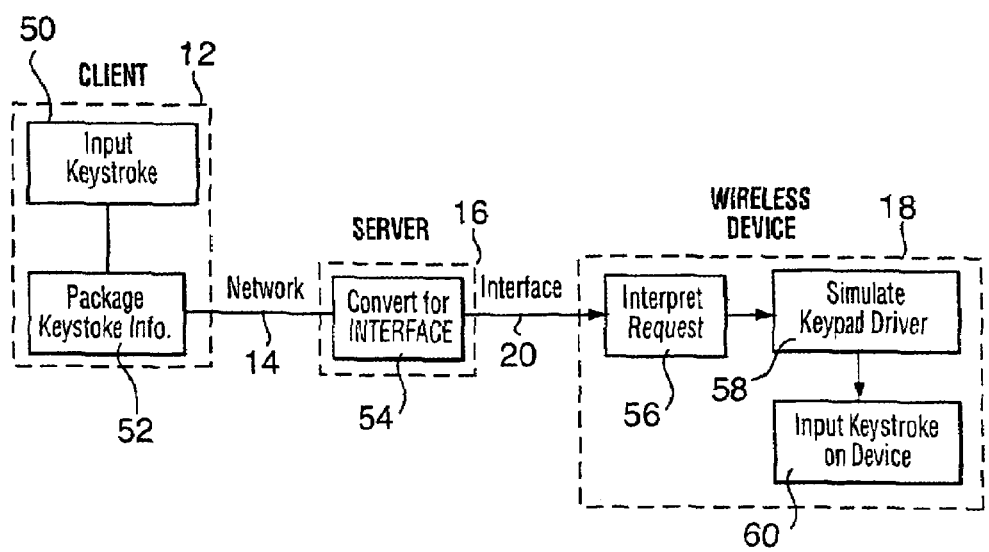
FIG. 4 is a process flow chart of the steps required to simulate a keystroke on the wireless device.

Reference is now made to FIG. 4. In order to simulate keystrokes, a keystroke made on the client machine 12 is passed to wireless data device 18. A user inputs a keystroke in step 50 on client machine 12. The keystroke can be either input through a keyboard or if the graphics display includes a full representation of the wireless data device, including the keypad of the wireless data device, a mouse click on the appropriate key can also be registered. Other means for inputting data of the client machine 12 is known to those skilled in the art.

Client machine 12 in step 52 recognizes that a keystroke has been input and converts this keystroke into a packet that can be sent across network 14.

Server machine 16 receives the packet from step 52 and in step 54 converts this packet to be transferred across interface 20.

Wireless device 18 includes a driver handling the interface. This driver interprets the request in step 56. The interface driver recognizes that the data packet is a keystroke and in step 58 the interface driver simulates a keypad driver. In this way, the wireless data device 18 thinks that the input came from its keypad. The simulated keypad driver next uses the data packet created in step 54 to input a keystroke on the wireless data device 18 in step 60.

Figure 5:
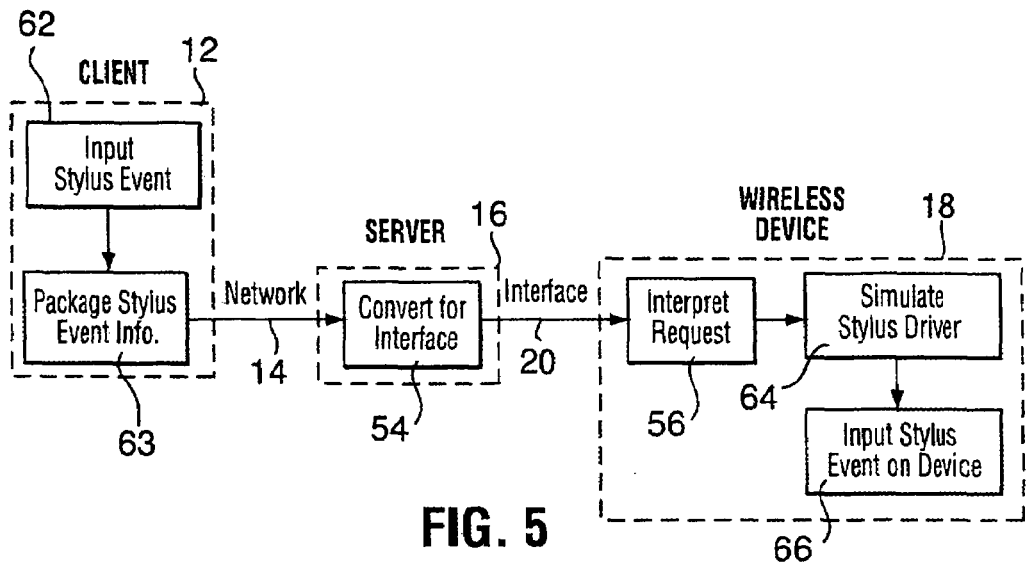
FIG. 5 is a process flow chart of the steps required to simulate a stylus on the wireless device.

Reference is now made to FIG. 5. As an alternative to keypad inputs, a method to simulate a stylus event on the wireless device is provided. A stylus event could be simulated through the use of a mouse on client machine 12, where clicking the mouse could be a pen down simulation, releasing the mouse could be a pen up simulation, and dragging the mouse over the LCD representation on client machine 12 could simulate the dragging of the mouse on wireless device 18.

As one skilled in the art will realize, the dragging of the mouse over the LCD representation on client machine 12 will generate an X and Y coordinate for the stylus, and when this changes a new event is sent from client machine 12 to wireless device 18. The movement events may be only sent during mouse clicks to simulate a stylus with the pen down, or may be sent even when the mouse is not clicked in some applications.

Further, as one skilled in the art will realize, a client machine may use means other than a mouse to simulate a stylus, including a touch screen, a stylus on the client machine, or other devices know to those in the art.

In FIG. 5, a stylus event is registered on client machine 12 in step 62. This event, as indicated above, may be the clicking, releasing, or moving of the mouse on the LCD representation on client machine 12.

In step 63, the stylus event is packaged for network transmission and is transmitted over network 14. The server machine 16 converts the event information for interface 20 in step 54 and sends this information over interface 20.

In step 56 wireless device 18 interprets the request and finds it is a stylus event. Based on the request a stylus driver is simulated in step 64. The driver in step 64 is used to input the stylus event on wireless device in step 66.

In this way, the user can simulate a stylus event remotely, allowing the remote user to control the device in a manner similar to that which a local user could.

Based on the above, the combination of the steps in FIGS. 2 to 5 provide a client machine 12 with control of wireless data device 18 from a remote location. The display of the wireless data device is updated regularly on client machine 12 through either periodic update requests or based on changes in the display of wireless device 18. Keystrokes or stylus events can be input from client machine 12. The desired features are thereby accomplished.

Specifically, in debugging situations where a wireless network is only available at a remote location, the wireless device can be connected to a server machine at that remote location with all of the testing being accomplished from the client location. Also, in the case of technical support, the wireless data device can be connected to a computer running the appropriate software, and a technical support employee can then have full control over the wireless device. A closed path communication can be established through the remote user interface 10 and wireless network 21.

For the training example, where the display of the wireless device is to be projected from a digital projector, client machine 12 and server machine 16 can be the same machine. In this case, network 14 is simulated on the client/server machine and communications between the client and server are performed on the same machine. Client machine 12 can further be connected to the digital projector. This allows wireless data device 18 to have its display projected through one computer running both client and server software.

Testing during the creation of a device is further provided for. In the case of a device in which a display or keypad have not yet been integrated into the hardware of the device, the present invention can be used to replace the display and keypad. Again, in this situation, client machine 12 and server machine 16 will be one machine and can be used in place of a display and keypad to ensure that the underlying hardware is working properly. Again, testing can be accomplished by sending communications from the device 18 to a tester's local computer over wireless network 21 by utilizing the remote user interface 10 to send the communications, or by sending information from the client machine 12 to the wireless device 18 and then monitoring the wireless device 18 using remote user interface 10.

Figure 6:
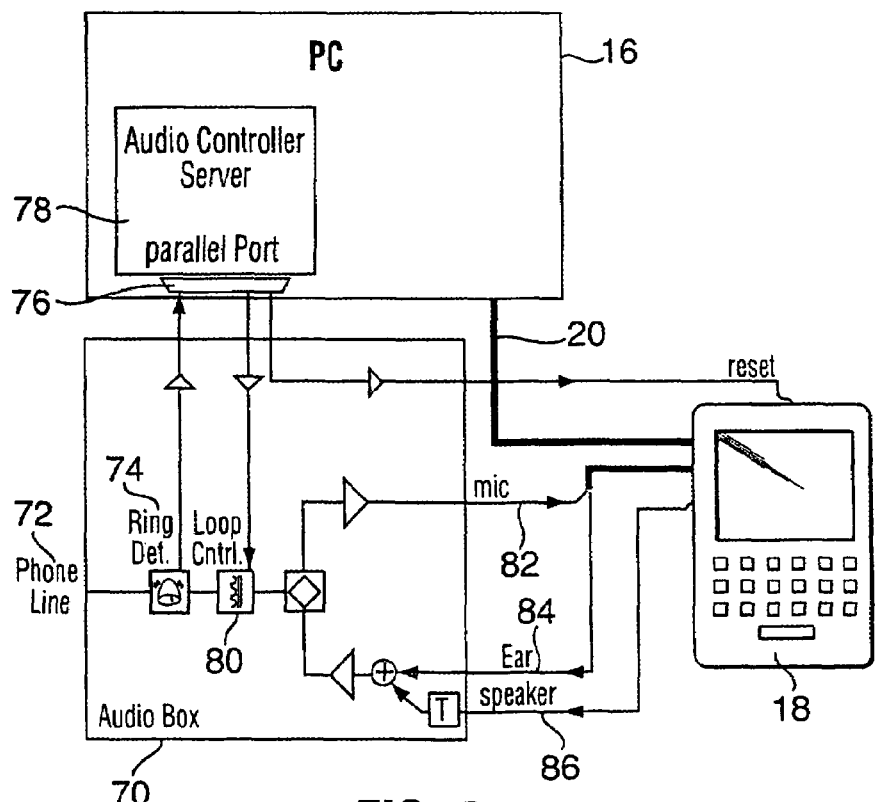
FIG. 6 is an alternative embodiment, including an audio output and input for the wireless device.

Reference is now made to FIG. 6. FIG. 6 shows a further embodiment in which capturing the audio functions of a wireless device is accomplished. As will be appreciated by those skilled in the art the audio remote user interface can be used independently from or in conjunction with a data remote user interface. If used in conjunction with a data remote user interface a wireless data device 18 is connected to a server machine 16 using an interface 20. The screen display and keyboard inputs for the embodiment of FIG. 6 are the same as those of FIGS. 1-5.

An audio box 70 can be added in order to have the audio of wireless data device 18 available to a remote user. The remote user can dial to a telephone line connected to audio box 70. The client machine 12 can further send a pre-existing command to server machine 16 to answer the telephone call. Once the telephone call is answered by server machine 16, audio from wireless data device 18 is connected and the telephone of the user simulates the audio of the wireless data device.

As indicated in FIG. 6, phone line 72 is connected to audio box 70 and a ring detector 74 signals to server machine 16 through a parallel port 76 that the telephone is ringing. If server machine 16 has received a command from client machine 12 to answer, audio controller server 78 sends a signal to loop controller 80 to answer the telephone. Audio box 70 is further connected through a microphone input 82 and a headphone or speaker output 84 or 86 respectively.

Based on the above, an audio signal traveling along a phone line 72 is connected through microphone input 82 to wireless data device 18, and thus can simulate an audio input to the wireless device 18. Further, audio output from the wireless device is sent either through headphones 84 or speakers 86 and these are captured and sent back across phone line 72 to a user telephone.

As one skilled in the art will appreciate, rather than using a parallel port 76 for a custom built audio box, an audio PC board such as the Pica Inline™ or any modem with headset interface can be used.

There is therefore provided a complete simulation of the wireless data device, including possible audio interface to the wireless data device from a remote location. Further, a complete audio closed loop can be accomplished by having a user dial up the wireless device being tested over a cellular telephone network (wireless network) and use the phone connection through audio box 70 to ensure that sound transmitted to the device is received and conveyed by the wireless device. As will further be appreciated by those skilled in the art, when using an audio box 70 for testing, wireless device 18 does not need to have data capabilities and can thus be a voice device.

Figure 7:
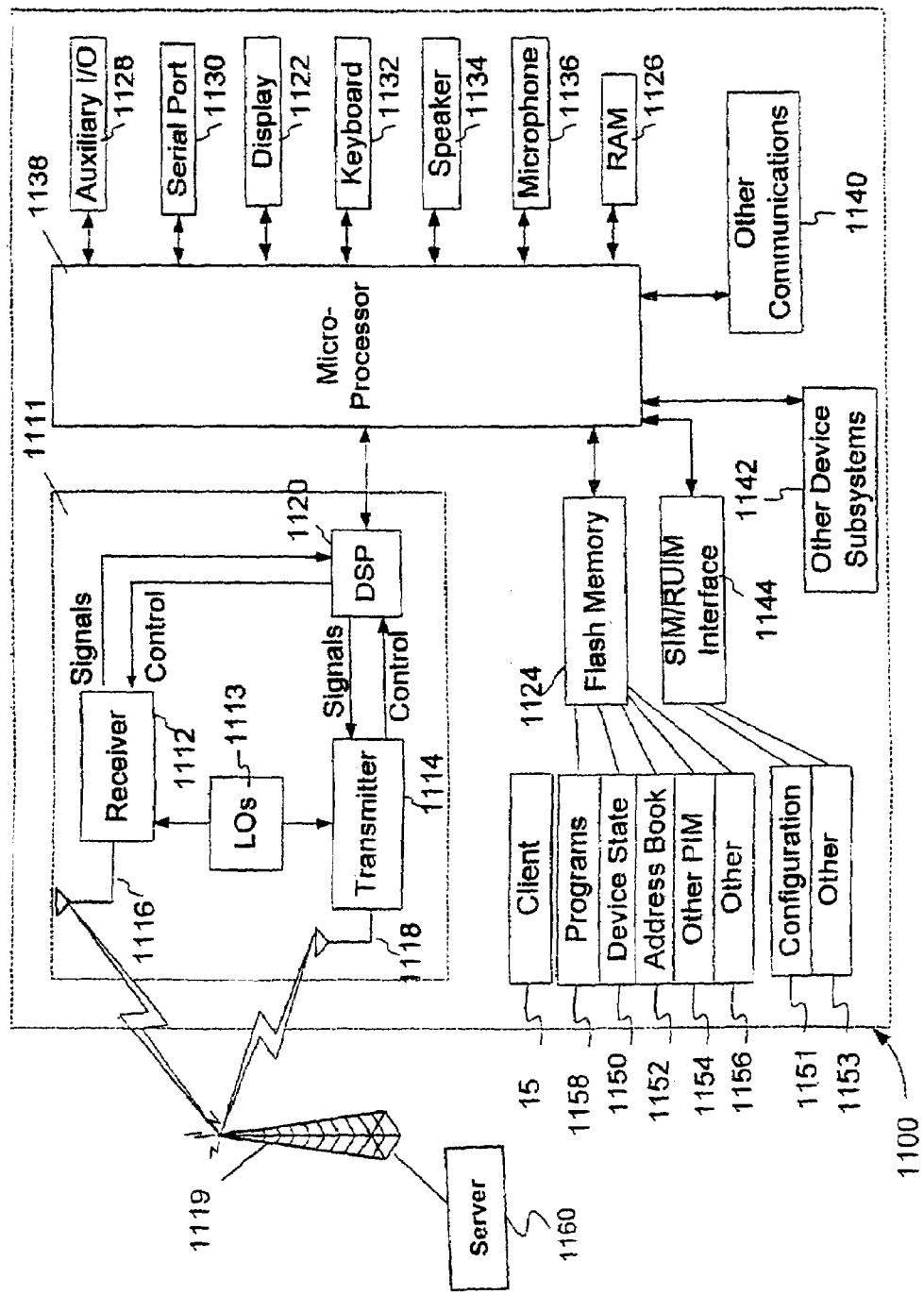
FIG. 7 is an exemplary block diagram of a data device that could be used in accordance with the present system and method.

Reference is now made to FIG. 7. FIG. 7 is a block diagram illustrating a host mobile station including preferred embodiments of the techniques of the present application. Mobile station 1100 is preferably a two-way wireless communication device having at least voice and data communication capabilities. Mobile station 1100 preferably has the capability to communicate with other computer systems on the Internet. Depending on the exact functionality provided, the wireless device may be referred to as a data messaging device, a two-way pager, a Wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile station 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile station 1100 is registered on the network using a unique identification number associated with each mobile station. In UMTS and GPRS networks, and in some CDMA networks, however, network access is associated with a subscriber or user of mobile station 1100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as emergency calling, may be available, but mobile station 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile station 1100 may send and receive communication signals over the network 1119. Signals received by antenna 1116 through communication network 1119 are input to receiver 1112, which may perform such common receiver functions as signal amplification, frequency down conversion, filtering, channel selection and the -like, and in the example system shown in FIG. 7, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

Mobile station 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 7 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile station. A predetermined set of applications that control basic operations, including at least data and voice communication applications for example, will normally be installed on mobile station 1100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile station user's corresponding data items stored or associated with a host computer system. Further applications may also be loaded onto the mobile station 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions-to be performed using the mobile station 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile station 1100 may also compose data items such as email messages for example, using the keyboard 1132, which is preferably a complete alphanumeric keyboard or telephone-type keypad, in conjunction with the display 1122 and possibly an auxiliary. I/O device 1128. Such composed items may then be transmitted over a communication network through the communication subsystem 1111.

For voice communications, overall operation of mobile station 1100 is similar, except that received signals would preferably be output to a speaker 1134 and signals for transmission would be generated by a microphone 1136. Alternative voice or audio I/O subsystems, such as a voice message recording subsystem, may also be implemented on mobile station 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 7 would normally be implemented in a personal digital assistant (PDA)-type mobile station for which synchronization with a user's desktop computer (not shown) may be desirable. Such a port 1130 would enable a user to set preferences through an external device or software application and would extend the capabilities of mobile station 1100 by providing for information or software downloads to mobile station 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile station 1100 and different systems or devices, which need not necessarily be similar devices. For example, the subsystem 1140 may include an infrared device and associated circuits and components or a Bluetooth™ communication module to provide for communication with similarly enabled systems and devices.

The exemplary mobile station of FIG. 4 is meant to be illustrative and other devices with more or fewer features than the above could equally be used for the present method and apparatus.

As will be appreciated by those skilled in the art, the use of a wireless device allows with the present system allows complete loop testing to be conducted from a remote location. Specifically, if the device is connected to a server 16 with interface 20, then a remote user with a client 12 can see what is received at device 18 and can further send information from device 18. This information can be sent from client 18 either through server 16 to the wireless device 18, or can be sent over a wireless network to the wireless device.

For example, if the tester is testing an email system, the tester can send an email as he/she normally would to the address of the wireless device through a data network to a base station which then passes the message wirelessly to the data device. The tester can also, through client 12 and server 16 see what is received by wireless device 18. Thus the tester can see whether the email message is received by the wireless device and whether there are any problems with the email message. Further, the tester can see what the device does when it first receives the email. For example, if the device should give an email alert to a user, the tester should see this email alert and then be able to access the message received.

Similarly, the tester can use client 12 to tell server 16 and wireless device 18 to send an email. The email recipient could be set to be the tester's email address, thus allowing the tester to wait for the email to be received at the local machine through the standard data network.

With the audio box, the user could telephone the wireless device on a first telephone line. A second telephone line could be used for controlling audio box 72 and to listen to and send information from wireless device 18.

Other options for communicating over the data network as well as over interface 20, thus forming a closed loop communications path, would be known to those skilled in the art.

The above-described embodiments are meant to be illustrative of preferred embodiments and are not intended to limit the scope of the present invention. Also, various modifications, which would be readily apparent to one skilled in the art, are intended to be within the scope of the present invention. The only limitations to the scope of the present invention are set forth in the following claims.

I claim:

1. A system for remotely testing a wireless data device, the system comprising: coded logic configured to be executed on the tested wireless data device, the coded logic including: instructions for capturing visual output of the tested wireless data device, the tested wireless data device being configured to provide the captured visual output; and instructions for simulating at least one input driver at the tested wireless data device, the simulated input driver being configured to act based on at least one received input request to cause the tested wireless data device to register an input in accordance with said input request, a remote user for interacting with the tested wireless data device from a remote location, the remote user interface including a client machine, the client machine including: coded logic configured to obtain the captured visual output provided by the tested wireless data device, the client machine being configured to display a graphical representation simulating a display of said tested wireless data device in accordance with said captured visual output; and coded logic configured to submit the at least one input request to the tested wireless data device; wherein a tester can monitor said wireless data device output and control said wireless data device via input sent over said remote user interface thereby forming a second closed loop communications path; and a wireless network for communication with the tested wireless data device from the remote location, wherein the tester can send information to and receive information from said wireless data device over said wireless network and can monitor said wireless data device and send input to said wireless data device over said remote user interface thereby forming a first closed loop communications path, and wherein said server machine further comprises an audio modem, said audio modem being connected to said wireless data device at a microphone input for said wireless data device and at a headset or speaker output of said wireless data device, said modem further being connected to a telephone line, whereby audio input and output to and from said wireless data device is transferred over said telephone line.

2. The system of claim 1, wherein the remote user interface includes:

a server machine associated with the wireless data device;

a communications channel for providing data exchange between said client machine and said server machine; and a connectivity interface for providing data exchange between said server machine and said wireless data device.

3. The system of claim 2, wherein said client machine is located remotely from said server machine.

4. The system of claim 2, wherein said connectivity interface is one of a USB connection, an infrared connection and a Bluetooth interface.

5. The system of claim 2, wherein said server machine converts data from said client machine based on said interface.

6. The system of claim 2, wherein said input is a keystroke on said client machine.

7. The system of claim 2, wherein said input is a stylus event on said client machine.

8. The system of claim 7, wherein said stylus event is one of a mouse click, a mouse release, and a cursor drag over said graphical representation simulating the display of said wireless data device on said client machine.

9. The system of claim 1 wherein said remote user interface includes an audio box, said audio box having a telephone connection and being connected to a parallel port of said server machine and to a microphone input and a headset or speaker output of said wireless data device, wherein audio input and output to and from said wireless data device passes through said audio box and over said telephone connection.

* * * * *